United States Patent
Bayat

(10) Patent No.: US 11,409,356 B1
(45) Date of Patent: Aug. 9, 2022

(54) USING DATA CORRELATION TO REDUCE THE POWER CONSUMPTION OF SIGNAL PROCESSING SYSTEMS WITHOUT AFFECTING THE PRECISION OF COMPUTATION

(71) Applicant: MENTIUM TECHNOLOGIES INC., Santa Barbara, CA (US)

(72) Inventor: Farnood Merrikh Bayat, Goleta, CA (US)

(73) Assignee: MENTIUM TECHNOLOGIES INC., Santa Barbara, CA (US)

( * ) Notice: Subject to any disclaimer, the term of this patent is extended or adjusted under 35 U.S.C. 154(b) by 0 days.

(21) Appl. No.: 17/100,707

(22) Filed: Nov. 20, 2020

Related U.S. Application Data

(60) Provisional application No. 62/938,214, filed on Nov. 20, 2019, provisional application No. 62/938,207, filed on Nov. 20, 2019, provisional application No. 62/938,211, filed on Nov. 20, 2019, provisional application No. 62/938,217, filed on Nov. 20, 2019.

(51) Int. Cl.
   *G06F 1/329* (2019.01)
(52) U.S. Cl.
   CPC .................... *G06F 1/329* (2013.01)
(58) Field of Classification Search
   CPC ........................................... G06F 1/329
   USPC ......................................... 713/300, 320, 321
   See application file for complete search history.

(56) References Cited

U.S. PATENT DOCUMENTS

| | | | | |
|---|---|---|---|---|
| 4,796,096 A * | 1/1989 | Sakura | ................... | H04N 9/804 386/203 |
| 10,366,586 B1 * | 7/2019 | Leizerovich | ....... | G06K 9/00342 |
| 2003/0076888 A1 * | 4/2003 | Daniell | ................ | G06F 17/148 375/260 |
| 2004/0148321 A1 | 7/2004 | Guevorkian et al. | | |
| 2006/0153304 A1 * | 7/2006 | Prakash | ................ | H04N 19/12 375/240.25 |
| 2007/0242747 A1 * | 10/2007 | Park | ...................... | H04N 19/51 375/240.12 |
| 2013/0181852 A1 * | 7/2013 | Krishnamoorthy | ..... | H03M 7/30 341/76 |
| 2015/0312574 A1 * | 10/2015 | Ying | ..................... | G09G 5/363 345/212 |
| 2018/0225116 A1 | 8/2018 | Henry et al. | | |

OTHER PUBLICATIONS

International Search Report and Written Opinion issued in corresponding application No. PCT/US2020/061685, dated Feb. 25, 2021.

* cited by examiner

*Primary Examiner* — Michael J Brown
(74) *Attorney, Agent, or Firm* — Maschoff Brennan

(57) ABSTRACT

A method and system for reducing power consumed in processing units when processing units are used to calculate computationally expensive linear functions on a sequence of correlated data. Processing of a new data sample may be performed to consume less power by using results obtained from the processing a previous reference data sample.

24 Claims, 4 Drawing Sheets

USING DATA CORRELATION TO REDUCE THE POWER CONSUMPTION OF SIGNAL PROCESSING SYSTEMS WITHOUT AFFECTING THE PRECISION OF COMPUTATION

CROSS-REFERENCE TO A RELATED APPLICATION

This patent application claims the benefit of and priority to U.S. Provisional App. No. 62/938,211, U.S. Provisional App. No. 62/938,207, U.S. Provisional App. No. 62/938,214, and U.S. Provisional App. No. 62/938,217, all filed Nov. 20, 2019, which are incorporated by reference in the present disclosure in their entireties for all that they disclose.

BACKGROUND

Deep neural networks or machine learning algorithms are a biologically-inspired class of algorithms that have recently demonstrated state-of-the-art accuracy in large-scale classification and recognition tasks and have been used for machine learning environments. Due to the high computational complexity of these algorithms, hardware acceleration of deep networks, machine learning or similar signal processing algorithms is of paramount importance to ensure their ubiquitous presence in future computing platforms.

Unfortunately, physical implementations of these or similar computationally expensive algorithms are extremely power hungry for at least two reasons. Firstly, these algorithms usually work on large volumes of data like high-resolution video or audio streams which will dramatically increase the costly (in terms of power consumption) internal or external memory access. Secondly, in these algorithms, large numbers of computations should be performed on each input pixel, which will require powerful but power-hungry accelerators. However, when data being processed is correlated, most of the memory accesses and computations performed in accelerators are redundant.

Another point to consider is that even if the efficiency of the accelerator performing the computations is very high, even infinite, the overall efficiency of the chip will be determined based on the power consumption of the SRAM from which all the weights and data are read. As a result, there has been a decrease in motivation to reduce the power of the accelerator. One main problem with the SRAM is that to read data from the SRAM, the bitlines of a very large array must be charged and discharged. The bigger the SRAM, the higher the density but also the higher the number of memory cells connected to the shared bitlines, which results in slower speed and higher power consumption.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In one embodiment, a method for reducing power consumed in processing units when processing units are used to calculate computationally expensive linear functions on a sequence of correlated data is provided. The method may include receiving a first data sample from a base input that contains a plurality of data samples. The method may further include applying a linear function to the first data sample to calculate a corresponding first output data sample. The method may also include receiving a second data sample from the base input and calculating the (sparse or low-amplitude) sample difference between the first data sample and the second data sample. The method may further include applying the linear function to the first and second sample difference to calculate a corresponding first and second sample difference output. Finally, the method may include adding the first and second sample difference output to the first data sample output to indirectly calculate a second data sample output.

In some embodiments, the first data sample may be a reference data sample and include a background signal, a pixels average, or a feature map.

In some embodiments, the first and second data samples may be a sequence of frames from a video.

In some embodiments, the method may also include receiving a third data sample from the base input and determining a correlation between the first data sample and the third data sample.

If a sufficient level of correlation between the first data sample and the third data sample is found to exist, the method may also include calculating the (sparse or low-amplitude) sample difference between the first data sample and the third data sample, applying the linear function to the first and third sample difference to calculate a corresponding first and third sample difference output, and adding the first and third sample difference output to the first data sample output to indirectly calculate a third data sample output.

If a sufficient level of correlation between the first data sample and the third data sample is not found to exist, the method may also include calculating the (sparse or low-amplitude) sample difference between the second data sample and the third data sample, applying the linear function to the second and third sample difference to calculate a corresponding second and third sample difference output, and adding the second and third sample difference output to the second data sample output to indirectly calculate a third data sample output.

In some embodiments, the amount of correlation between the samples is calculated on the fly.

In some embodiments, the amount of correlation between the samples is determined in advance based on the statistics and distribution of samples.

In another embodiment an accelerator architecture system is disclosed. The system may include a memory and a processor that is coupled to the memory. The processor may be configured to receive a data sample A from a base input that contains a plurality of data samples. The processor may also be configured to apply a function $f(.)$ having corresponding parameters W to the data sample A to calculate a corresponding data sample output $f(A, W)$. The processor may further be configured to receive a data sample B from the base input and calculate the (sparse or low-amplitude) sample difference between data sample A and data sample B. The processor may also be configured to apply the function $f(.)$ to the sample difference to calculate a corresponding sample difference output $f(B-A, W)$ and add the sample difference output $f(B-A, W)$ to the first data sample output $f(A, W)$ to indirectly calculate a data sample output $f(B, W)$.

In some embodiments, the function may be a linear function or a non-linear function following a linear function.

In some embodiments, the processor may be further configured to receive a data sample C from the base input and determine a correlation between data sample A and data sample C.

If a sufficient level of correlation between data sample A and data sample C is found to exist, the processor may be further configured to calculate the (sparse or low-amplitude) sample difference between data sample A and data sample C, apply the function f(.) to the sample difference between data sample A and data sample C to calculate a corresponding sample difference output f(C−A, W), and add the sample difference output f(C−A, W) to the data sample output f(A, W) to indirectly calculate a data sample output f(C, W).

If a sufficient level of correlation between the first data sample and the third data sample is not found to exist, the processor may be further configured to calculate the (sparse or low-amplitude) sample difference between data sample B and data sample C, apply the function f(.) to the sample difference between data sample B and data sample C to calculate a corresponding sample difference output f(C−B, W), and add the sample difference output f(C−B, W) to the data sample output f(A, W) to indirectly calculate a data sample output f(C, W).

In another embodiment, a method for reducing power consumed in processing units when processing units are used to calculate computationally expensive linear functions on a sequence of correlated data is disclosed. The method may include receiving a first input signal and a second input signal. The method may also include applying a first operational function to the first signal to generate a first new input signal and applying the first operational function to the second signal to generate a second new input signal. The method may further include applying a second operational function to the first new input signal to generate a first new signal output and subtracting the first new input signal from the second new input signal using an element-wise subtractor to generate a difference signal. The method may also include applying the second operational function to the difference signal to generate a corresponding difference signal output and adding the difference signal output to the first new signal output to indirectly calculate a second new signal output for the second new input signal.

In some embodiments the dimensions of the first input signal are equal to the dimensions of the first new input signal, and the dimensions of the second input signal are equal to the dimensions of the second new input signal.

In some embodiments, the first and second input signals are different frames from a video stream.

In some embodiments, the first operational function is a computation of the first layers of a machine learning algorithm and the first and second new input signals are output feature maps of a network up to a particular layer to which the computation of a subsequent layer may be applied.

In some embodiments, the second operational function is a 2D or 3D convolution or a vector-by-matrix or matrix-by-matrix multiplication.

In some embodiments, the first input signal is a first received signal or a signal equal to the average of the pixels of a single or multiple input signals.

The object and advantages of the embodiments will be realized and achieved at least by the elements, features, and combinations particularly pointed out in the claims. Both the foregoing summary and the following detailed description are exemplary and are not restrictive of the invention as claimed.

BRIEF DESCRIPTION OF THE DRAWINGS

Example embodiments will be described and explained with additional specificity and detail through the use of the accompanying drawings in which.

DETAILED DESCRIPTION

Figure 1A:
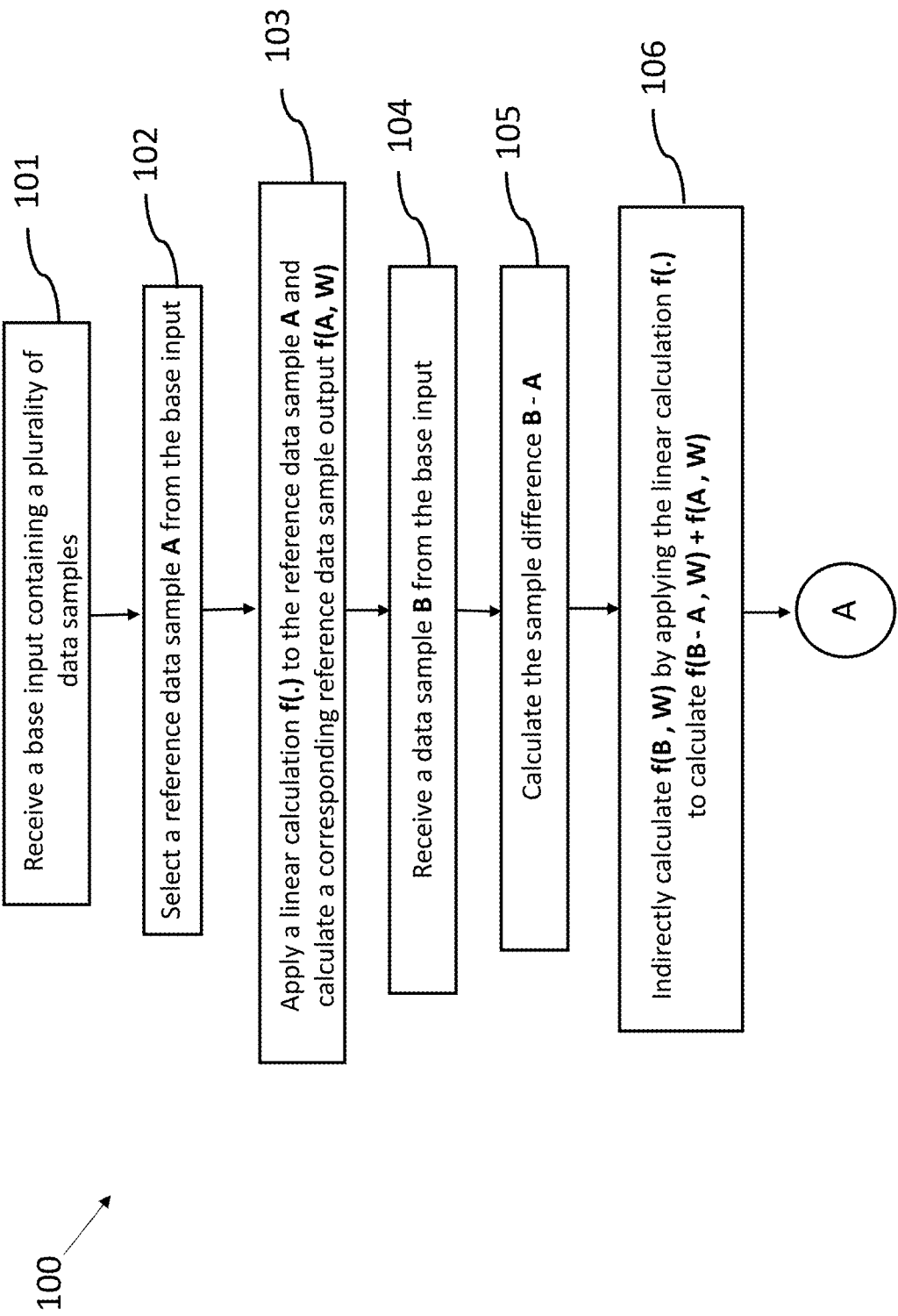
FIGS. 1A and 1B illustrate a flowchart summarizing the steps to take to reduce the power consumed by an accelerator or signal processor when performing a computationally expensive operation.

One or more embodiments of the present disclosure may include a method or an accelerator architecture to reduce the power consumed in processing units like accelerators when used to calculate the computationally expensive linear function on the sequence of correlated data. The method of computation may be implemented in an accelerator or signal processor by changing the original algorithm or the underlying hardware. The accelerator may receive a sequence of highly correlated data samples like frames of the video footage either from the memory or directly from the sensor, process one or multiple of the data samples at a time by applying a function which may be either a linear function or can be written as a combination of a linear followed by non-linear function (like the activation functions following the convolution operation in deep neural networks). The result of the process may be written back to the memory or may be sent to outside of the chip.

The processing system may consume most of the power in two places: (i) in the accelerator when executing the function and (ii) in the SRAMs storing the results. The power consumed in the accelerator or SRAMs may be dependent on the sparsity or the distribution of the input data samples, and the parameters used to apply the specific function to these data samples. The power in these modules may be reduced by changing the way data has been represented and encoded.

In some embodiments, due to the correlation between subsequent data samples, processing of one data sample may be performed to consume less power by using the results obtained by processing the previous data samples. For this purpose, the reference data sample A may be processed independently by applying the linear function f(.) to the data sample A to obtain the result f(A, W) where W is parameters needed to execute the function f(.). To process the second or the subsequent input data samples B, first the difference between the current and the reference data samples, i.e. B−A, may be calculated. Then the same function f(.) may be applied by an accelerator to the subtraction result to produce f(B−A, W). Finally, the produced result f(B−A, W) may be added to the result of applying function f(.) to the reference data sample, i.e. f(A, W), to obtain the final result, i.e. f(B−A, W)+f(A, W), which is equal to the result of applying function f(.) directly to the second data sample, i.e. f(B, W). In this method of computing, executing f(B−A, W) instead of f(B, W) in each step may reduce the power consumed in the accelerator performing this operation because, due to the correlation between data samples A and B, most elements of signal B−A may be either zero or have very small values. This may reduce the power of the accelerator if the accelerator is designed to consume less power when input data has a distribution compressed around zero.

In some embodiments, the input data samples may be images, audio signals or the frames of the video stream.

In some embodiments, accelerator may be designed to work with sign-magnitude data representation and format so the power consumed in the accelerator may depend on the amplitudes of the signals being processed. Indirect calculation of f(B, W) may reduce the power consumption of this type of accelerators.

In some embodiments, the reference data sample A may be the previous data sample, the first data sample, or the fixed data sample equal to the background, average or median of the input signal.

In some other embodiments, the input data sample may be a scalar, a vector, a matrix or a multidimensional tensor with any arbitrary sizes.

In some embodiments, the subsequent data samples to which a function f(.) may be applied are the data coming from a single data sample (using intraframe correlations). In other embodiments, the subsequent data samples to which a function f(.) may be applied are the data coming from different data sample (using interframe correlations).

The only constraint on the function f(.) may be its linearity allowing the function f(B, W) to be expressed as f(B−A, W)+f(A, W). Any nonlinear function which may be expressed as g(f(.)) where g(.) is a nonlinear and f(.) is a linear function may still be implemented as g(f(B, W))=g(f(B−A, W)+f(A, W)).

In some embodiments, the method may be used to implement the computations of deep neural networks and machine learning algorithms. In these applications, the function f(.) may be the multidimensional convolutional operation, a vector-by-matrix or a matrix-by-matrix multiplication. The variable W may be the network parameters or weights for the particular layer being executed and the data samples A and B may be the feature maps generated after executing the previous layer of the network. In some other embodiments, data samples A and B may be the feature maps generated at layer ith of the network when two different but correlated inputs are applied to the inputs of the neural network (like subsequent frames of the video stream).

In some embodiments, the computing system may require more memory to store the previous result f(A, W) so it can be used later when processing the next data sample B.

In some embodiments, the function f(B, W) may be computed directly instead of f(B−A, W)+f(A, W) if the power consumed to perform f(B, W) is less than the power needed to consume f(B−A, W)+f(A, W). This may happen if either the correlation between A and B is small or if the amount of computation for executing the function f(.) is sufficiently small that it doesn't justify the extra power consumed by the extra subtraction and addition operation performed to compute f(B−A, W)+f(A, W).

In some embodiments where the correlation between subsequent data samples is large, multiple data samples may be processed using the same reference data sample. The frequency of refreshing the reference data sample may be proportional to the correlation between data samples and the speed by which the statistics of the data changes.

In some embodiments, to maximize the power reduction in the accelerator, this method of data decoding and performing computation may be combined with accelerators or processors where power consumption is proportional to the amplitude of the input signal as well as W. Also, the proposed method will generate higher reduction in power consumption by performing more computation per each input and/or output of function f(.) to reduce the effect of SRAM's power consumption.

In some other embodiments, the proposed method of performing computations on correlated data may be combined with accelerators which perform computations on Least Significant Bits (LSB) of inputs with lower precision to save power. In these types of architectures, most of the power may be consumed to execute the computations related to Most Significant Bits (MSB) of inputs and parameters with higher precision, which are having the most impact on the result of the computation. On the other side, less power may be consumed in these accelerators to compute LSB bits of inputs and weights by reducing the precision of computation. Since most MSB bits in the input sample B−A will be zero when A and B are highly correlated, this will reduce the power consumed in circuits related to MSB bits.

In some embodiments, input data sample A may be any previous data sample that has correlation with any of the next data samples B. For less correlated data samples, A needs to be the data sample close to B (like the next pixel) to keep the correlation between A and B as high as possible to reduce the accelerator power as low as possible. As a result, for less correlated data samples, like movie frames captured at low frame rates, when moving to pixel C, f(C, W) may be computed as f(B, W)+f(C−B, W) using the previous sample B. However, if the data is highly correlated, or if just a portion of sample changes from sample to the next sample, the first data sample A and f(A, W) may be used for multiple subsequent data samples. For example, f(C, W) may be calculated as f(A, W)+f(C−A, W).

In some embodiments where the correlation between subsequent data samples is large, the base data sample A may be the first captured frame, the background signal, fixed pixel average signal, fixed value equal to the mean or median of all data samples, etc.

Minimum power may be consumed in the accelerators if A and B are subsequent data samples in the equation f(B, W)=f(A, W)+f(B−A,W) while simpler architecture with less number of memory access may be achieved by keeping data sample A fixed for multiple or all of the subsequent calculations.

As long as the power consumed to perform the computation of f(B−A, W) and the extra addition with f(A, W) is less than the power consumed for the direct calculation of f(B, W), using the indirect calculation may reduce the power in the accelerator independent from the accelerator architecture or the exact definition of function f(.).

In some embodiments, A and B data samples may be scalars, vectors, matrices, or tensors.

In some embodiments, A and B data samples may be subsequent data samples like subsequent video or audio frames or samples. In other embodiments, A and B may be sets of nearby pixels within frames or feature maps. In some other embodiments, A and B may be feature maps generated by a network at specific layer for two different but correlated input signals or frames.

Figure 1B:
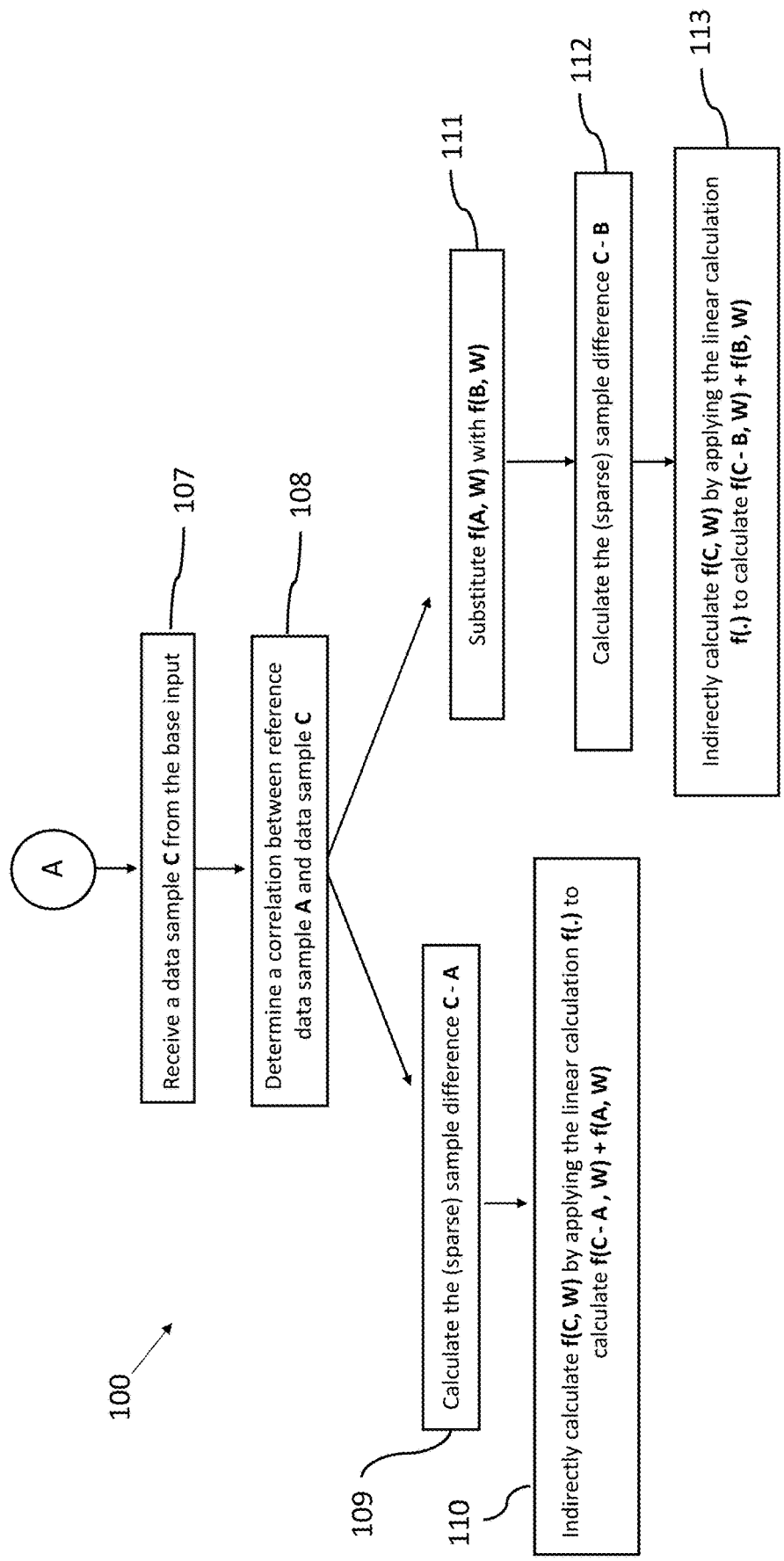

FIGS. 1A and 1B show a flowchart of an example method 100 for performing computationally expensive but linear operations in an accelerator or processor to reduce the power consumed to accomplish the computation. The method may include, at action 101, receiving a base input. The base input may include a plurality of data samples.

The method 100 may include, at action 102, selecting a reference data sample A from the base input. Reference data sample A may be a background signal, pixels average, first or previous frame or feature maps, etc. In some embodiments, a first input in a series of inputs to be processed in an accelerator may be selected as the reference data sample. Based on the amount of correlations within subsequent data samples and their statistics, different signals may be considered for the reference data sample. For example, for video frames with large and fixed background, the reference data sample may be selected to be a background image. For video streams with frames changing rapidly from frame to frame, the reference data sample may be selected to be the first frame in this stage or the previous frame.

The method may include, at action 103, applying any linear function f(.) to the reference data sample A and calculating a corresponding reference data sample output f(A, W). In this stage the function f(.) with its corresponding parameters W may be applied to the reference data sample A selected at action 102 and the result f(A, W) may be stored in the memory.

The method may include, at action 104, receiving a data sample B from the base input. In this stage, the accelerator may receive data sample B to which it may need to apply function f(.) with the same parameters W. This data sample B may be any type of signal. For example, data sample B may be similar to the type of reference data sample A.

The method may include, at action 105, calculating the (sparse or low-amplitude) sample difference B−A. In this stage, the accelerator or the processor, instead of directly calculating f(B, W), will first calculate the difference between the two subsequent samples, i.e. B−A. Due to the high correlations between the two data samples, the resulting B−A may have most of its elements either equal to zero or very close to zero.

The method may include, at action 106, indirectly calculating f(B, W), by applying the linear calculation f(x) to calculate "f(B—A, W)+f(A, W)" where f(A, W) has been calculated in previous steps. In this step, similar to action 103, the accelerator may apply the function f(.) to B−A instead of B to calculate f(B−A, W) and then add the result to f(A, W) (which is the output of calculation for previous data sample computed in action 103). Calculating f(B, W) indirectly as f(B−A, W)+f(A, W) may reduce the power consumption of the accelerator since it uses the previously calculated result f(A, W) and also due to the fact that now most inputs of the accelerator i.e. B−A are either zero or very small.

The method may include, at action 107, receiving a data sample C from the base input. The method may include, at action 108, determining a correlation between reference data sample A and data sample C. In the event that a high correlation exists between reference data sample A and data sample C, then the method may proceed to action 109 and calculate the (sparse or low-amplitude) sample difference C−A. In some embodiments, a threshold level of correlation is identified and must be met or exceeded to retain data sample A as the reference data sample. The amount of correlation between subsequent samples C and A or the threshold value may be calculated for each new data sample C on the fly or it may be decided in advance considering the statistics and distributions of samples C and A. In some other embodiments, correlation between a small portions of samples C and A may be calculated on the fly as an estimation of total correlation between these two samples.

The method may include, at action 110, indirectly calculating f(C, W), by applying the linear calculation f(x) to calculate "f(C−A, W)+f(A, W)" where f(A, W) has been calculated in previous steps. In this step, similar to action 103, the accelerator may apply the function f(.) to C−A instead of C to calculate f(C−A, W) and then add the result to f(A, W) (which is the output of calculation for previous data sample computed in action 103). Calculating f(C, W) indirectly as f(C−A, W)+f(A, W) may reduce the power consumption of the accelerator since it uses the previously calculated result f(A, W) and also due to the fact that now most inputs of the accelerator i.e. C−A are either zero or very small Alternatively, if at action 108 it is determined that there does not exist a high correlation between reference data sample A and data sample C or a threshold level of correlation is not satisfied, then the method may include, at action 111, substituting f(A, W) with f(B, W) calculated at action 106 for the application of function f(.) to data sample C. Thus, data sample B becomes the new reference data sample and the same procedure may be repeated for the calculation of f(C, W) but this time using sample B as a reference data sample. In general, whenever the correlation between a current data sample and a reference data sample becomes small, the reference data sample may be replaced with a more similar data sample in the new calculation. Steps 107-113 may be repeated for all data samples within the base input until all the data samples are processed.

The proposed method of computation may be used whenever there is a correlation between subsequent inputs being processed. In the applications involving images or videos, there may be two types of correlation that one can take advantage of: (i) interframe and (ii) intraframe correlations.

Figure 2:
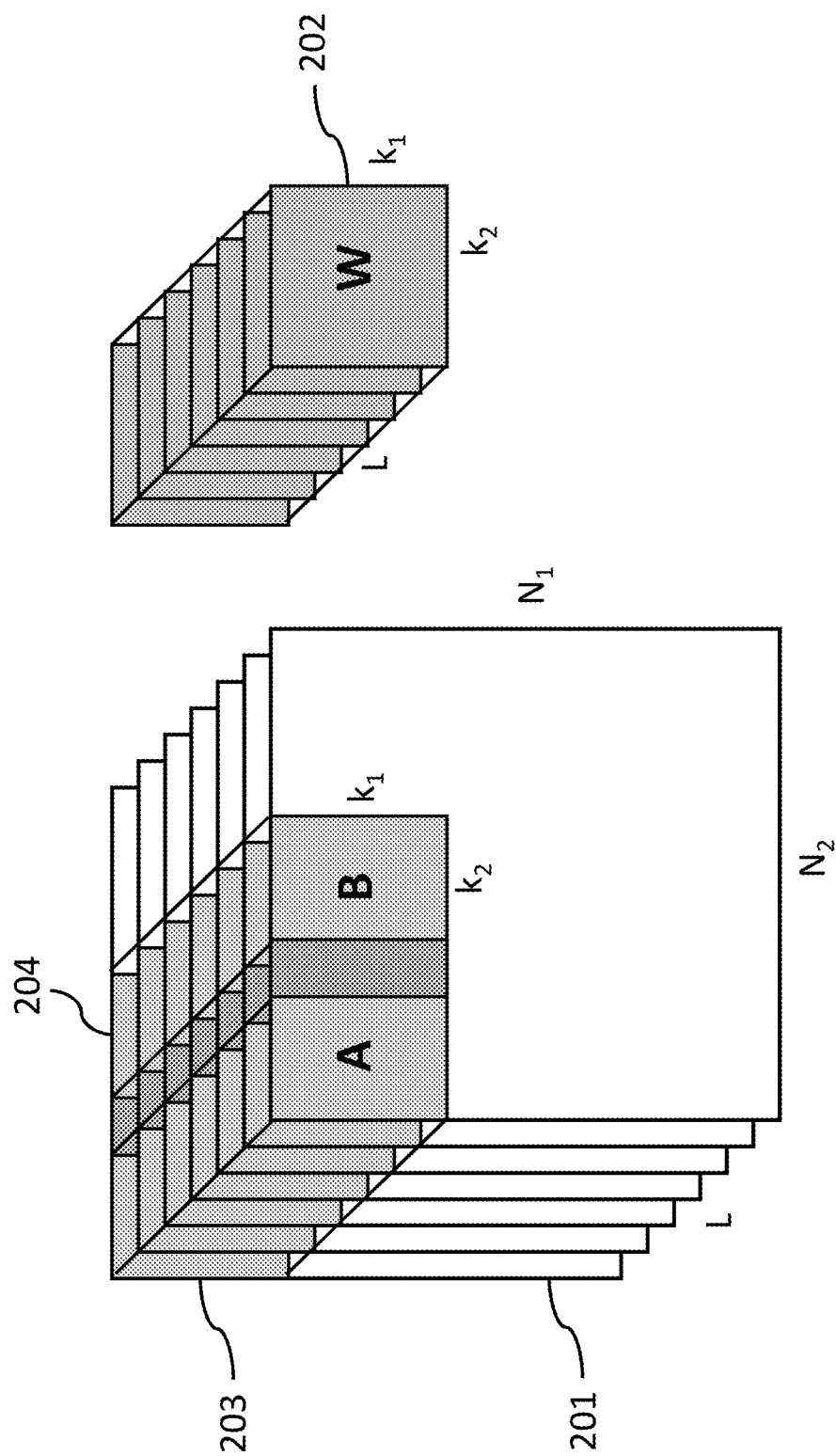
FIG. 2 illustrates an example of using the correlation between the elements of the single data sample to minimize the power consumed to apply a same function to a sequence of correlated inputs.

FIG. 2 illustrates an example of defining current and previous data samples to be used as subsequent data samples A and B when implementing a linear operation to take advantage of the existing correlations within a single input data. The input signal 201 may consist of L number of $N_1$-by-$N_2$ 2D signals (channels) where a function f(.) with parameters 202 with dimensions $k_1$-by-$k_2$-by-L may be applied to a sequence of data samples 203 and 204 where each is a subset of input signal 201. In this configuration, data sample 203 with a size of $k_1$-by-$k_2$-by-L may be applied to the accelerator for the calculation of the function f(A, W) where A and W are 203 and 202. Then in the next step, the accelerator may need to calculate the same function with the same parameters of a second set of data 204, called B, which may again be a subset of input signal 201. To calculate function f(B, W), first data sample A may be subtracted element by element from data sample B to form the signal B−A, and then the function may be applied to the result to do the calculation f(B−A, W). By adding the result of calculation performed on the first data sample A, the result of applying function f(.) to the second data sample B may be achieved.

In some embodiments, the example provided in FIG. 2 may be utilized to use the correlation between the nearby pixels in video or image signals to reduce the power consumed in the accelerator by implementing f(B−A, W)+f(A, W) instead of directly calculating f(B, W). Without correlation between data samples 203 and 204, there may be more efficient to directly calculate f(B, W).

In some embodiments, there may or may not be an overlap between the data samples A and B in FIG. 2. In addition, there may or may not be any correlation between the L channels in the input signal 201.

In some embodiments, the function f(.) may be a 2D, 3D, or 4D convolution applied to L feature maps. In other embodiments, the function f(.) may be a vector-by-matrix or a matrix-by-matrix multiplication.

Dimensions $k_1$, $k_2$, and L may have any values. For example, dimensions $k_1$ and $k_2$ may range from 1 to $N_1$ and $N_2$ respectively.

By increasing the distance between the locations of data sample A and data sample B in the original signal 201, the correlation between the two data samples may be reduced.

Values of first data sample A (203) for all subsequent calculations of f(B−A, W)+f(A,W) may be replaced with a fixed values. The fixed values may be different at different L channels. In some embodiments, the fixed value may be equal to the average of the pixels in that channel. In other embodiments, specific pixel value in each channel may be used as data sample A in all the following calculations. The pixel chosen for this purpose may have the maximum correlation with most of the pixels in that layer of feature maps.

Figure 3:
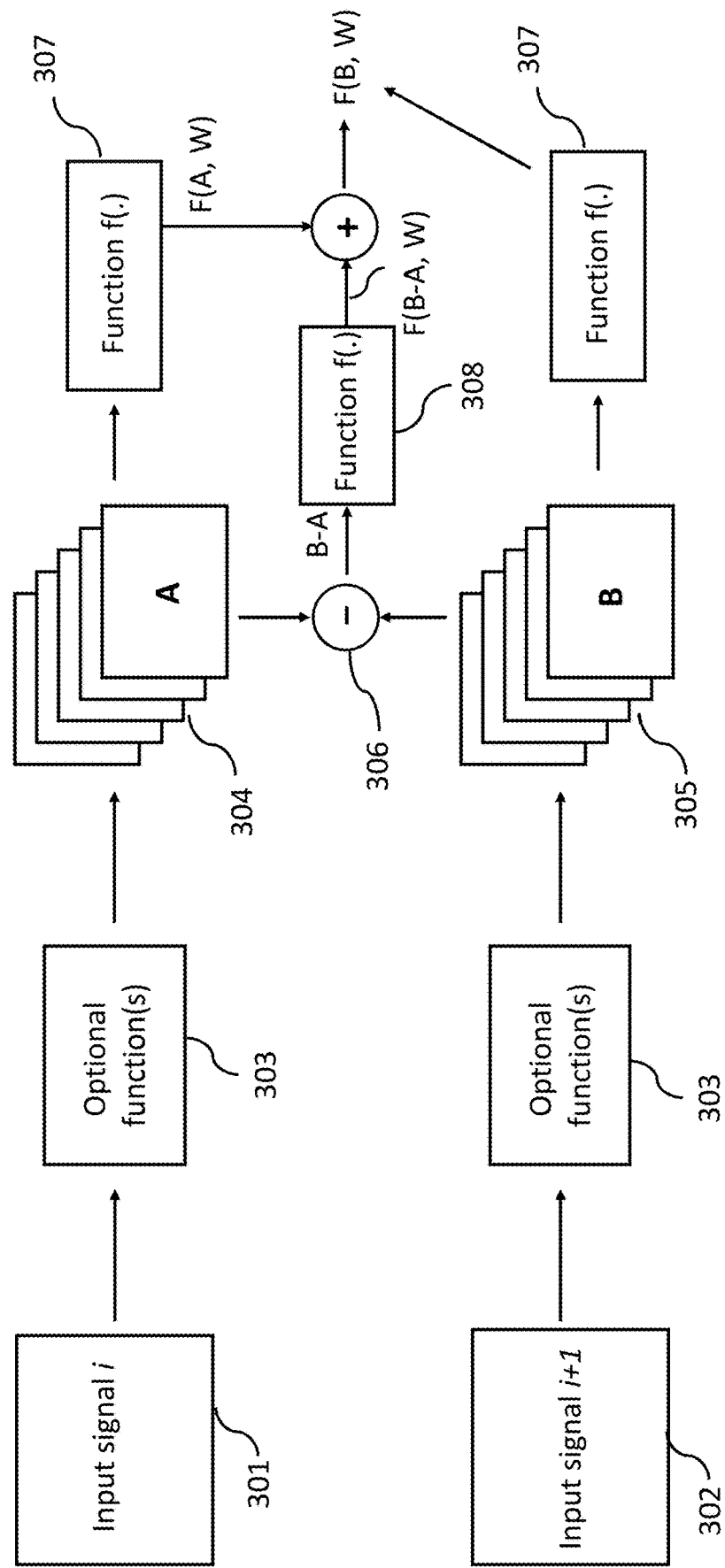
FIG. 3 illustrates an example of using the correlation between the multiple and subsequent data samples to minimize the power consumed to apply a same function to these correlated inputs.

FIG. 3 illustrates an example of how a correlation between two subsequent input signals i and i+1 may be used to reduce the power consumed in an accelerator when it is used to apply a same function to both of these input signals. The result of applying function f(.) to any subsequent input i+1 may be computed based on the already calculated result of applying the same function to the previous input i.

A set of optional operations and functions 303 may be applied to any given input 301 or 302 to convert the original inputs to the new set of signals 304 and 305 where their dimension may be equal or different from the original signals 301 and 302. Applying a function f(.) to the current converted input signal 305 (called signal B) may be done by first subtracting generated signal 304 from the generated signal 305 using an element-wise subtractor 306 and then apply the function f(.) using block 308 to the result of the subtraction, i.e. B−A, to get f(B−A, W) where W is the parameters of the function f(.). Finally, the function f(B, W) may be calculated by adding the already calculated function f(A,W) in previous step to f(B−A, W). The power consumed to calculate f(B, W) indirectly by first calculating f(B−A, W) and then adding f(A, W) may be much less than the power consumed to calculate the function f(B,W) directly because the function f(A, W) has already been calculated when processing input signal i, 301 and the calculation of f(B−A, W) may consume much less power since most elements or pixels in the signal B−A are zero. Processing of the next input signal i+2 (not shown) may be done similarly but this time by using the results calculated for the input signal i+1 instead of i.

In some embodiments, the input signals i and i+1 (301 and 302) may be different frames of a video stream. In some other embodiments, the input signals 301 and 302 may be some intermediate signals calculated based on some other input signals.

In some embodiments, the optional function(s) 303 may be the computations of the first layers of the deep neural networks or machine learning algorithms. In this case, intermediate signals 304 or 305 may be the output feature maps of the network up to a particular layer to which the computation of the next layer may be applied.

In some embodiments, the function 307 or 308 applied to the input signals 304 or 305 may be a computationally expensive operation like a 2D or 3D convolution, vector-by-matrix or matrix-by-matrix multiplication. In these cases, the parameters W may be the neural network parameters or kernels.

In some embodiments, the reference signal i 301 may be the previous input. In other embodiments, the reference signal i 301 may be fixed and used when processing all the subsequent input signals. The fixed reference signal may be the first received signal, the signal equal to the average of the pixels of a single or multiple input signals, or a signal close to the background of the signal being processed.

In some embodiments, the function f(B, W) may be calculated directly if the power consumed to process it directly is less than the power consumed to make the calculation indirectly due to the overhead of extra memory accesses.

The method illustrated in FIG. 3 may increase the memory footprint of the accelerator since the intermediate results generated when calculating input signal i (i.e. signal A and f(A, W)) have to be stored in the memory to be used later when processing the next input signal, i+1.

Any type of accelerator or processing unit with any architecture may be used to execute the function f(.). Power reduction may be achieved in the accelerator implementing f(B, W) indirectly only if the accelerator's power consumption is directly proportional to the amplitude and/or the sparsity of the input signal.

In some embodiments, the method of using correlation within input signals shown in FIG. 2 may be combined with the method of using correlation between different input signals shown in FIG. 3.

In this and other embodiments, performing the computations on a sparse signal B−A instead of B directly may also be used to lower the power consumption of SRAMs storing the inputs and the results of computations. Storing B−A instead of A may lower the switching probability of SRAM bitlines when reading consequent input data samples from the SRAM because now most MSB bits of data are zero. Pre-charging mechanism of SRAM bitlines may be removed to improve the energy saving. In some other embodiments, these data may be stored in sparse memories. In some embodiments, smaller number of bits may be used to store B−A if A and B are highly correlated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A method for reducing power consumed in processing units when the processing units are used to calculate computationally expensive linear functions on a sequence of correlated data, the method comprising:
   receiving a first data sample from a base input, wherein the base input contains a plurality of data samples;
   applying a linear function to the first data sample to calculate a corresponding first data sample output;
   receiving a second data sample from the base input;
   calculating a first (sparse or low-amplitude) sample difference between the first data sample and the second data sample;
   applying the linear function to the first sample difference to calculate a corresponding first sample difference output; and
   adding the first sample difference output to the first data sample output to indirectly calculate a second data sample output that represents application of the linear function to the second data sample.

2. The method of claim 1, wherein the first data sample is a reference data sample and includes at least one of a first or a previous data sample, a background signal, a pixels average, and a feature map.

3. The method of claim 1, wherein the first data sample and the second data sample are a sequence of frames from a video.

4. The method of claim 1, further comprising:
   receiving a third data sample from the base input; and
   determining a correlation between the first data sample and the third data sample.

5. The method of claim 4, wherein when a sufficient level of correlation between the first data sample and the third data sample is found to exist, the method further includes:
   calculating a second (sparse or low-amplitude) sample difference between the first data sample and the third data sample;
   applying the linear function to the second sample difference to calculate a corresponding second sample difference output; and
   adding the second sample difference output to the first data sample output to indirectly calculate a third data sample output.

6. The method of claim 4, wherein when a sufficient level of correlation between the first data sample and the third data sample is not found to exist, the method further includes:
   calculating a third (sparse or low-amplitude) sample difference between the second data sample and the third data sample;
   applying the linear function to the third sample difference to calculate a corresponding third sample difference output; and
   adding the third sample difference output to the second data sample output to indirectly calculate a third data sample output.

7. The method of claim 4, wherein an amount of correlation between the first, second, and third data samples is calculated on the fly.

8. The method of claim 4, wherein an amount of correlation between the first, second, and third data samples is determined in advance based on statistics and distribution of the first, second, and third samples.

9. An accelerator architecture system, comprising:
   a memory; and
   a processor coupled to the memory, the processor being configured to:
      receive a data sample A from a base input, wherein the base input contains a plurality of data samples;
      apply a function f(.) having corresponding parameters W to the data sample A to calculate a corresponding data sample output f(A, W);
      receive a data sample B from the base input;
      calculate a (sparse or low-amplitude) sample difference between the data sample A and the data sample B;
      apply the function f(.) to the sample difference between the data sample A and the data sample B to calculate a corresponding sample difference output f(B−A, W); and
      add the sample difference output f(B−A, W) to the data sample output f(A, W) to indirectly calculate a data sample output f(B, W).

10. The system of claim 9, wherein the function f(.) is a linear function.

11. The system of claim 9, wherein the function f(.) is a combination of a non-linear function following a linear function.

12. The system of claim 9, wherein the data sample A is a reference data sample and includes at least one of a previous or a first data sample, a background signal, a pixels average, and a feature map.

13. The system of claim 9, wherein the data sample A and the data sample B are a sequence of frames from a video.

14. The system of claim 9, wherein the processor is further configured to:
  receive a data sample C from the base input; and
  determine a correlation between the data sample A and the data sample C.

15. The system of claim 14, wherein when a sufficient level of correlation between the data sample A and the data sample C is found to exist, the processor is further configured to:
  calculate a (sparse or low-amplitude) sample difference between the data sample A and the data sample C;
  apply the function f(.) to the sample difference between the data sample A and the data sample C to calculate a corresponding sample difference output f(C−A, W); and
  add the sample difference output f(C−A, W) to the data sample output f(A, W) to indirectly calculate a data sample output f(C, W).

16. The system of claim 14, wherein when a sufficient level of correlation between the data sample A and the data sample C is not found to exist, the processor is further configured to:
  calculate a (sparse or low-amplitude) sample difference between the data sample B and the data sample C;
  apply the function f(.) to the sample difference between the data sample B and the data sample C to calculate a corresponding sample difference output f(C−B, W); and
  add the sample difference output f(C−B, W) to the data sample output f(A, W) to indirectly calculate a data sample output f(C, W).

17. The system of claim 14, wherein an amount of correlation between the data samples A, B, and C is calculated on the fly.

18. The system of claim 14, wherein an amount of correlation between the data samples A, B, and C is determined in advance based on statistics and distribution of the data samples A, B, and C.

19. A method for reducing power consumed in processing units when the processing units are used to calculate computationally expensive linear functions on a sequence of correlated data, the method comprising:
  receiving a first input signal;
  receiving a second input signal;
  applying a first operational function to the first input signal to generate a first new input signal and applying the first operational function to the second input signal to generate a second new input signal;
  applying a second operational function to the first new input signal to generate a first new input signal output;
  subtracting the first new input signal from the second new input signal using an element-wise subtractor to generate a difference signal;
  applying the second operational function to the difference signal to generate a corresponding difference signal output; and
  adding the difference signal output to the first new input signal output to indirectly calculate a second new signal output for the second new input signal.

20. The method of claim 19, wherein:
  dimensions of the first input signal are equal to dimensions of the first new input signal, and
  dimensions of the second input signal are equal to dimensions of the second new input signal.

21. The method of claim 19, wherein the first and second input signals are different frames from a video stream.

22. The method of claim 19, wherein the first operational function is a computation of first layers of a machine learning algorithm and the first and second new input signals are output feature maps of a network up to a particular layer to which the computation of a subsequent layer may be applied.

23. The method of claim 19, wherein the second operational function is a 2D or 3D convolution a vector-by-matrix multiplication, or a matrix-by-matrix multiplication.

24. The method of claim 19, wherein the first input signal is a first received signal or a signal equal to an average of pixels of a single or multiple input signals.

* * * * *